Figure 1:
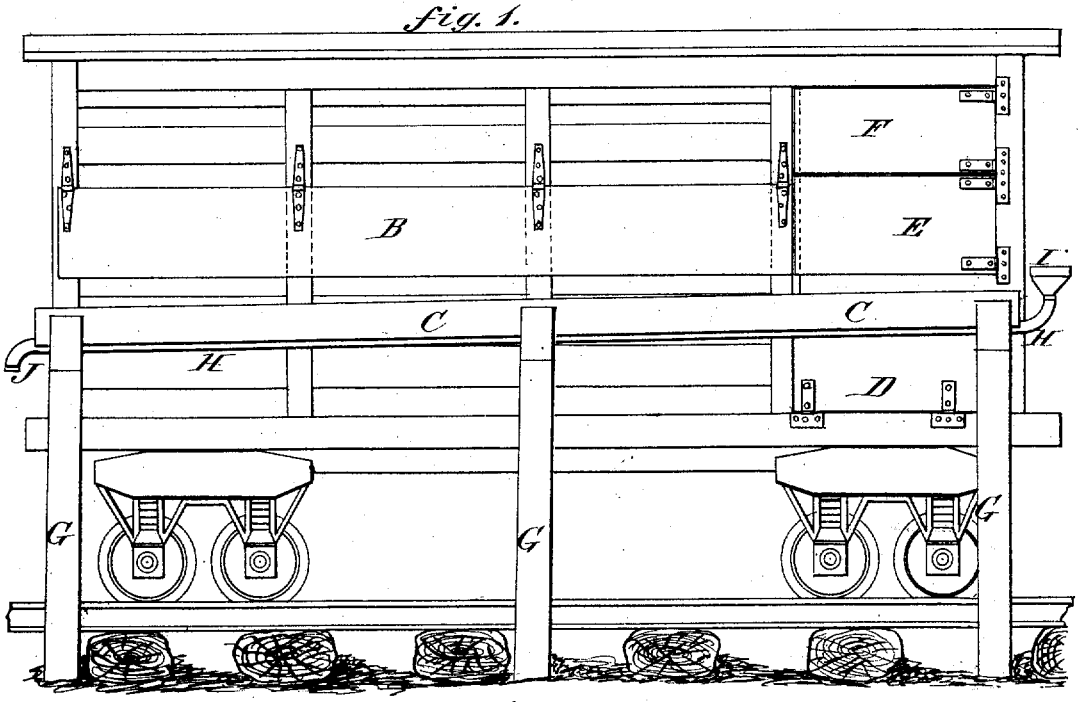

2 Sheets—Sheet 1.

J. R. McPHERSON.

DEVICE FOR FEEDING AND WATERING STOCK IN CARS.

No. 6,953. Reissued Feb. 29, 1876.

*Witnesses:*

J. West Wagner.

J. A. Rutherford

*Inventor:*

John R. McPherson by Johnson and Johnson, his Attorneys.

N. PETERS, PHOTO-LITHOGRAPHER, WASHINGTON, D. C.

2 Sheets—Sheet 2.

J. R. McPHERSON.

DEVICE FOR FEEDING AND WATERING STOCK IN CARS.

No. 6,953. Reissued Feb. 29, 1876.

Witnesses:

J. Rest Wagner.

J. H. Rutherford.

Inventor:

John R. McPherson, by Johnson and Johnson, his Attorneys.

N. PETERS, PHOTO-LITHOGRAPHER, WASHINGTON, D. C.

UNITED STATES PATENT OFFICE.

JOHN R. McPHERSON, OF JERSEY CITY, NEW JERSEY.

IMPROVEMENT IN DEVICES FOR FEEDING AND WATERING STOCK IN CARS.

Specification forming part of Letters Patent No. 173,035, dated February 1, 1876; reissue No. 6,953, dated February 29, 1876; application filed February 17, 1876.

*To all whom it may concern:*

Be it known that I, JOHN R. McPHERSON, of Jersey City, in the county of Hudson and State of New Jersey, have invented new and useful Improvements in Stock-Cars, and in means for feeding and watering the animals they carry, of which the following is a specification:

I propose to water and feed cattle and horses in their transportation by rail by using the common cattle-cars, with comparatively little cost, and without the use of troughs constructed within the cars, which are not only expensive, but greatly increase their weight. These are very important matters, and my invention is designed to avoid this plan. To this end my preferred means consist in providing the cars with longitudinal openings in their sides of sufficient size to allow the entire heads and horns of the animals to pass outside of the car-wall, for the purpose of feeding and watering from troughs located at convenient distances upon the track from the sides of the car, to allow live stock to reach them from both sides of the car. Hinged folding or sliding shutters are combined with these longitudinal side openings, for closing them while the cars are in motion, and for opening them for the purpose stated. The doors for the ingress and egress of the animals are made in three sections, the intermediate one being combined with and forming a continuation of the longitudinal side shutters, to open out, and thus obtain an opening in the full length of the car, so that it is impossible for the animals to stand in any position in the car that will prevent them from getting to the feed and water troughs. I combine with the track-troughs a pipe having a funnel at one end, and supplying alternate sections of the trough with water, the opposite end of this pipe being turned down, by which to discharge all the water from the trough and pipe when the cattle are done drinking and prevent freezing. There will be a sufficient number of sections in the troughs to enable the animals each to have a feed and water box before them when the longitudinal shutters are opened. These troughs and their water appliances are placed on the track-ties between the rails, and at their outer sides at a proper height to be reached by the animals from both sides of the car. It is the intention to stop the train a sufficient time to give the stock time to eat and drink. It is the intention to continue the troughs along the track in series, each of sufficient length to feed and water a full train of forty or more cars at a time.

A highly important advantage resulting from my invention is the utilization of the stock-cars now in use without much expense for alteration, and avoiding the extra weight in transit of food and water and their appliances. For the purpose of feeding and watering animals in stock-cars while being transported by rail, my invention, broadly, is a feed and water trough or troughs arranged parallel with the car-track, at a distance therefrom, free of the car-walls, and suitably elevated to present feed and water to said animals in or upon such car or stock-car when the train passing over said track is stopped at said troughs, the cattle remaining in or upon the car, as the description more fully sets forth.

Figure 2:
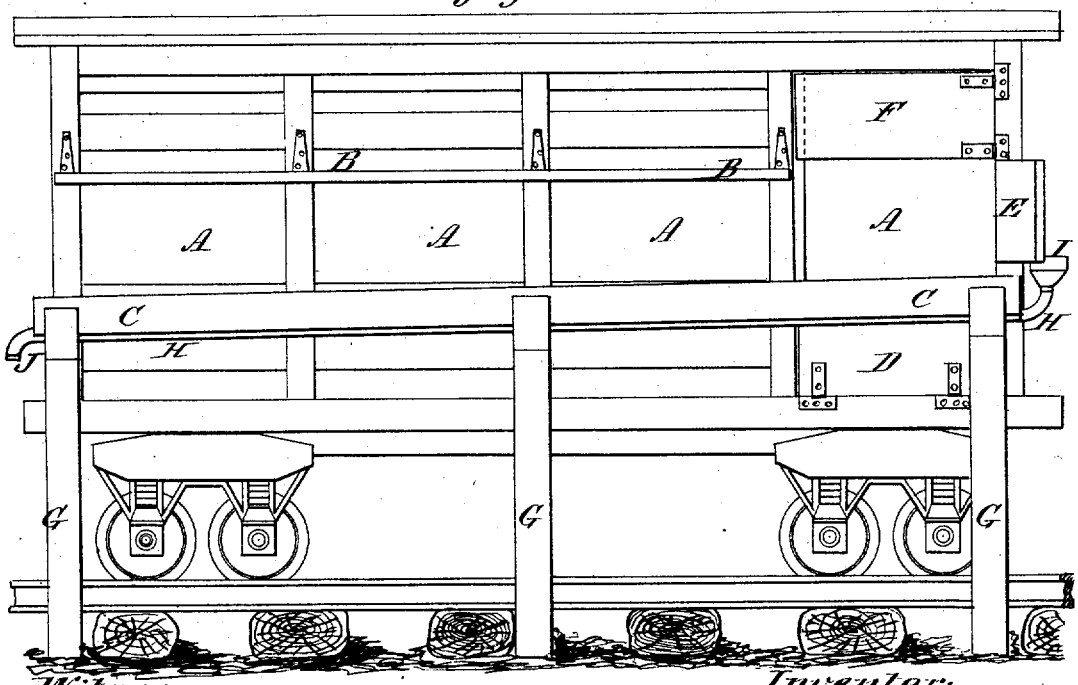
Figure 3:
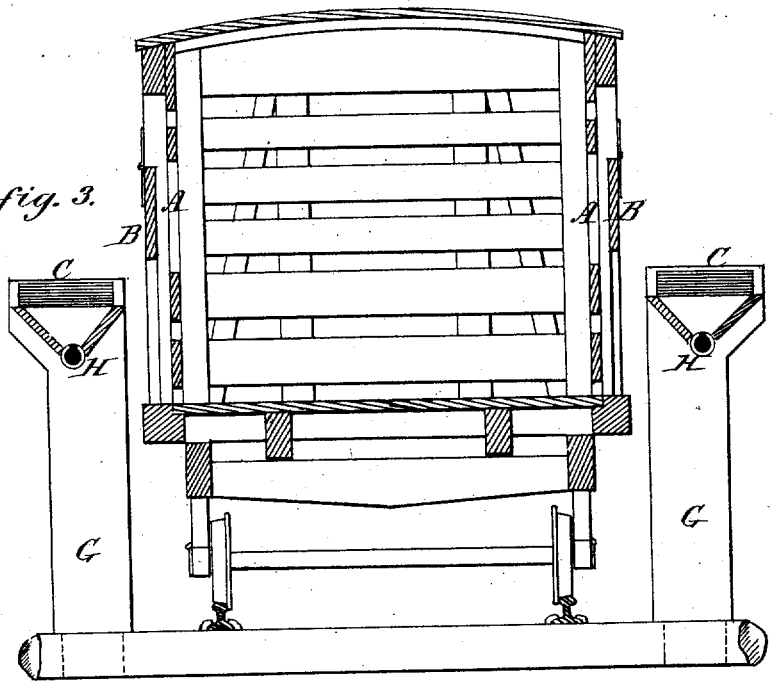
Figure 4:
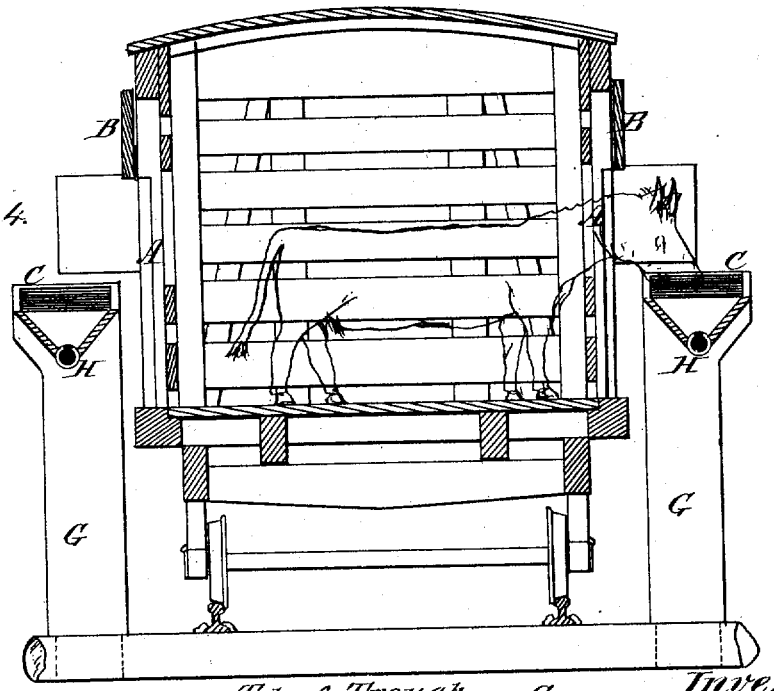
Figure 4:
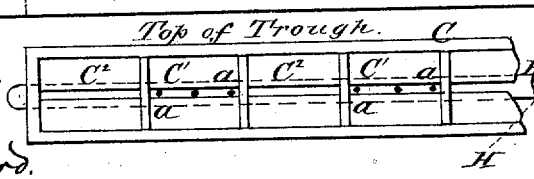

In the accompanying drawings, Figure 1 represents an elevation of a single car embracing my invention, and shown in position alongside of a trough, parallel with the track; Fig. 2, a similar view, showing the side shutters open, to allow the cattle to feed; Fig. 3, a vertical cross-section, and Fig. 4 a similar view.

The cars may be of the ordinary construction suitable for the transportation of live stock, and to adapt these for use in connection with my invention I form longitudinal openings A in their sides, at a height to bring them on a level with the heads of the cattle or other stock. These openings I provide with long shutters B, which may be either hinged, folding, or sliding, so as to be opened, to allow the head and horns of the cattle to protrude, for the purpose of reaching food and water placed in troughs C, arranged along and parallel with the side or sides of the track or tracks, at convenient distances to be reached by the animals from the cars. While the cars are in motion these shutters are closed and fastened.

As these openings must extend the full length of the cars, and as each car must be provided with doors for the ingress and exit of the stock, I form the doors in three sections, D E F, with the middle one, E, in line with and forming a continuation of the long side shutter B, so that it may be opened outwardly, to make the opening the full length of the car, as shown in Fig. 2, whereby all the cattle may have a free open space along the side wall of the car, through which to feed and water from both sides.

In the example shown these sectional doors are arranged at the ends of the cars, on opposite sides; but they may be arranged in the middle, and answer the purpose as well. The drawings also represent the long side shutters as hinged, so as to be turned upward and hooked; but any suitable arrangement of doors may be used, so long as they open a free space in the side walls, for the purpose stated.

The troughs C are arranged upon and parallel with the track, on the outer sides of the outer rails, and between the inner rails, upon a suitable frame-work, G, at a suitable height to be reached by the animals through the side car-openings.

These troughs are divided into as many or more divisions, $C^1$ $C^2$, as the cars will carry stock, and they are provided with pipes H, running along their bottoms, with suitable openings *a* therein, for each alternate division $C^1$ of the troughs to supply water. They have each at one end a funnel, I, through which to supply the water for the stock, their opposite ends being turned down and provided with a plug, J, by which, after the cattle have been watered, to let out the remainder, both from the troughs and the pipes, which are inclined in one direction for that purpose, to prevent freezing and keep them clean.

These troughs are arranged continuously to suit the longest train, and at such distances from the rails to allow the cattle to reach and feed and drink from them, the cars, for this purpose, being stopped alongside of them, the food being placed in each alternate section, and the water entering from the pipes into the other sections.

It is believed that this plan of permanent troughs and cars with side openings will give the best accommodations for the proper feeding and watering of stock in transit, and it is evident that feed-depots can be established at such stations as will give little trouble in carrying out this new plan, and relieving the cars of the weight and inconvenience of carrying food and water, with the expensive appliances necessary for that purpose and as hitherto adopted.

When the doors are opened for the entrance or exit of the cattle the lower sections open downward to form the platforms over which the cattle pass, and, when closed, they are suitably fastened.

By my new method the cars have no weight in feeding and watering appliances to carry, and no devices to get out of order or to be cleaned out, and the troughs can be roughly and permanently constructed as track fixtures, and between which the cars pass freely. The track-ties are the best means for securing these troughs, but they may be secured in the ground by posts as well; but they must be well supported and braced to render them strong. They can easily be kept in order, and the cattle feed therefrom while in the cars as readily as if they were upon the ground, and with no danger of injury to them or the troughs.

I claim—

1. For the purpose of feeding and watering animals in stock-cars while being transported by rail, a feed and water trough or troughs arranged parallel with the car-track, at a distance therefrom, free of the car-walls, and suitably elevated to present feed and water to said animals in or upon such car or stock car when the train passing over said track is stopped at said troughs, the cattle remaining in or upon the car.

2. For the purpose of utilizing the ordinary cattle-cars for feeding and watering, the combination of such a car, having side openings A for the heads of the cattle, with fixed track-troughs C, at suitable distances on the track or at the depots, upon each side, from which the stock feeds and waters when the train is stopped for that purpose.

3. The combination, in a stock-car, of the sectional doors D E F, in which the intermediate sections E are combined with the long shutters B of the side openings, to furnish continuous side openings from end to end of the car, through which the cattle feed from the fixed track-troughs.

4. For the purpose of utilizing the ordinary cattle-cars for feeding and watering, the combination of such a car, having side openings A for the heads of the cattle, with fixed track-troughs C, as described, said troughs provided with divisions $C^2$ $C^1$ and water-supply pipes H, as herein set forth.

In testimony whereof I have affixed my signature in the presence of two witnesses.

JOHN R. McPHERSON.

Witnesses:
S. H. SMITH,
WM. H. H. KASE.